(12) United States Patent
Specht

(10) Patent No.: US 6,331,034 B1
(45) Date of Patent: Dec. 18, 2001

(54) APPARATUS FOR ADJUSTING THE INCLINATION OF A BACKREST OF A VEHICLE SEAT

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/574,323

(22) Filed: May 19, 2000

(30) Foreign Application Priority Data

Dec. 22, 1999 (DE) .............................. 199 62 225

(51) Int. Cl.⁷ .................................................... B60N 2/02
(52) U.S. Cl. ...................... 297/362.11; 297/362
(58) Field of Search .............................. 297/362, 362.11; 475/331

(56) References Cited

U.S. PATENT DOCUMENTS

| | | |
|---|---|---|
| 3,401,979 | 9/1968 | Putsch .................................. 297/362 |
| 3,972,563 | 8/1976 | Gustafsson ........................... 297/362 |
| 4,143,912 | 3/1979 | Kramer ................................. 297/362 |
| 4,836,606 * | 6/1989 | Werner . |
| 4,934,755 * | 6/1990 | Berghoff . |
| 5,462,498 * | 10/1995 | Lindblad . |

FOREIGN PATENT DOCUMENTS

| | | |
|---|---|---|
| 4302042A1 | 7/1994 | (DE) . |
| 4303042 | 7/1994 | (DE) . |
| 19630325 | 3/1997 | (DE) . |
| 19724555 | 11/1998 | (DE) . |
| 2735083 | 2/1996 | (FR) . |

* cited by examiner

*Primary Examiner*—Milton Nelson, Jr.
(74) *Attorney, Agent, or Firm*—Lonnie R. Drayer

(57) ABSTRACT

An apparatus adjusts the inclination of a back rest of a vehicle seat with an electric motor and a hand wheel as adjusting drives which act on the adjustable back rest frame via an adjusting gear. The hand wheel is arranged coaxial with the rotor of the electric motor and accommodates the motor components as a hood-shaped housing in its interior. The hand wheel and the electric motor have a common output shaft connected to the adjusting gear.

18 Claims, 4 Drawing Sheets

APPARATUS FOR ADJUSTING THE INCLINATION OF A BACKREST OF A VEHICLE SEAT

FIELD OF THE INVENTION

The present invention relates to an apparatus for adjusting the inclination of a backrest of a vehicle seat.

DISCUSSION OF THE PRIOR ART

It is known to adjust the inclination of the backrest of the vehicle seat using an electric motor and/or hand wheel which act via an adjusting gear on an adjustable rigid back rest frame.

SUMMARY OF THE INVENTION

The present invention provides a compact apparatus for adjusting the inclination of a backrest of a vehicle seat comprising both a hand wheel and an electric motor as adjusting drives. With the invention, the hand wheel is arranged coaxial with the rotor of the electric motor and the hand wheel forms a hood-shaped housing that receives the motor components in the interior of the hood-shaped housing. The hand wheel and the electric motor also preferably possess a common output shaft connected to the adjusting gear. Advantageously, the rotor of the electric motor and the hand wheel can be arranged coaxially to the output shaft for this purpose, and the hand wheel can be non-rotatably connected to the output shaft from a released position by hand, for example by exertion of pressure.

The reduction gear is preferably integrated into the electric motor. It can be designed as a planetary gear as known, for example, from DE 43 02 042 A1.

With the adjusting device according to the invention, the inclination of the backrest can be adjusted both manually and electrically, and the components required for these adjusting drives are accommodated compactly. The backrest can be adjusted for comfort. The backrest can also be pre-adjusted for safety if there is a risk of a crash that is possibly detected by precrash sensors. Sensor signals of this type can be obtained, for example, from the brake pressure, from the electrical stability control of the vehicle, from information concerning longitudinal, transverse and vertical deceleration or external distance sensors and the like. The pivoting of the back rest is reversible owing to the electric motor drive, i.e., if there is no crash, the back rest can be brought back to its original inclination.

A basic safety adjustment of the back rest can be achieved automatically by appropriate control of the electric motor drive by means of electric signals which are proportional to the weight of the vehicle occupant, the longitudinally adjusted position of the seat and/or the extracted length of belt webbing. Manual actuation by the hand wheel is possible in the event of a power failure.

BRIEF DESCRIPTION OF THE DRAWINGS

The invention will be described in more detail by means of an embodiment with reference to the figures, in which.

DETAILED DESCRIPTION OF THE INVENTION

Figure 1:
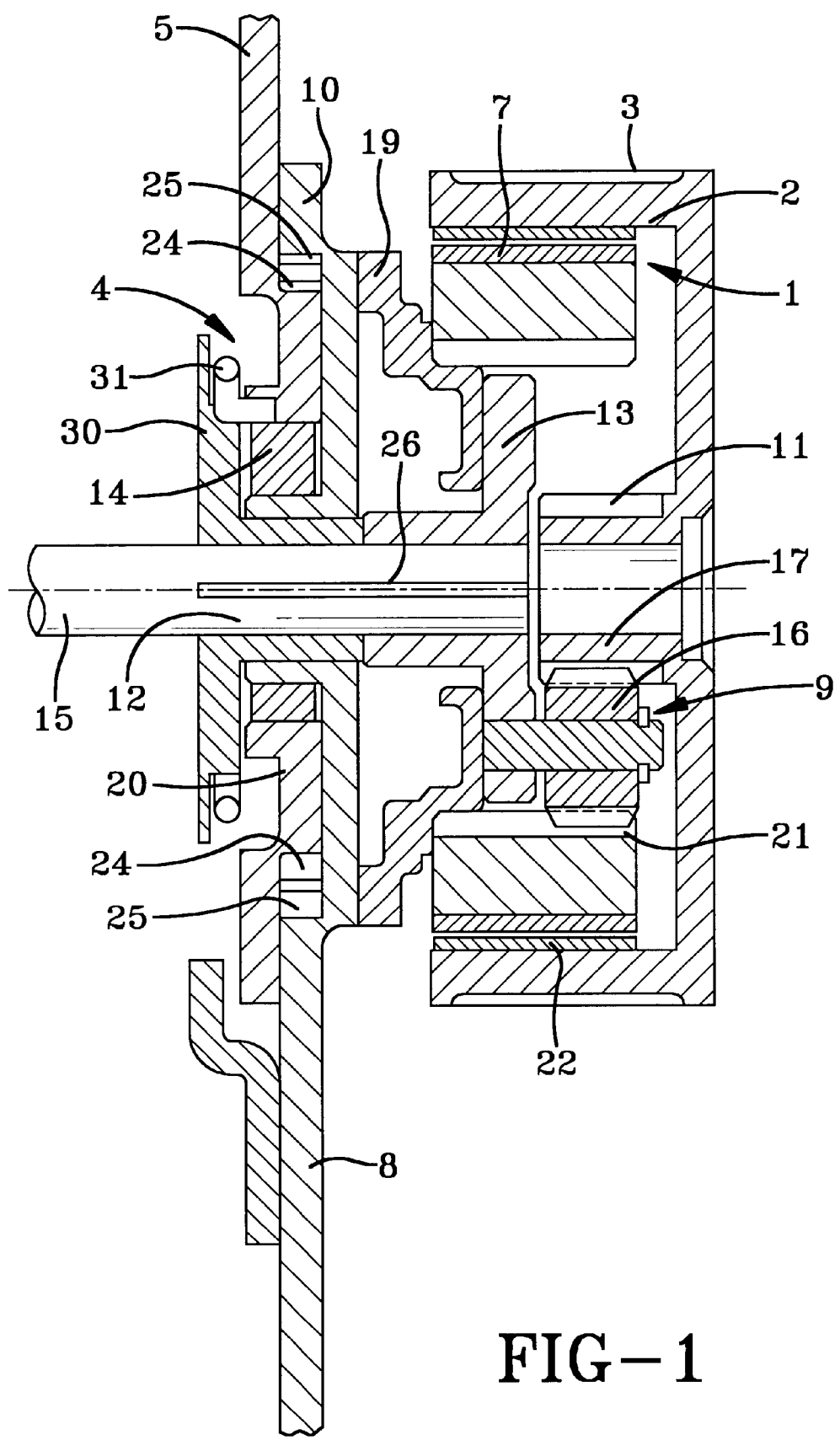
FIG. 1 is a sectional view through an embodiment of the invention.
Figure 2:
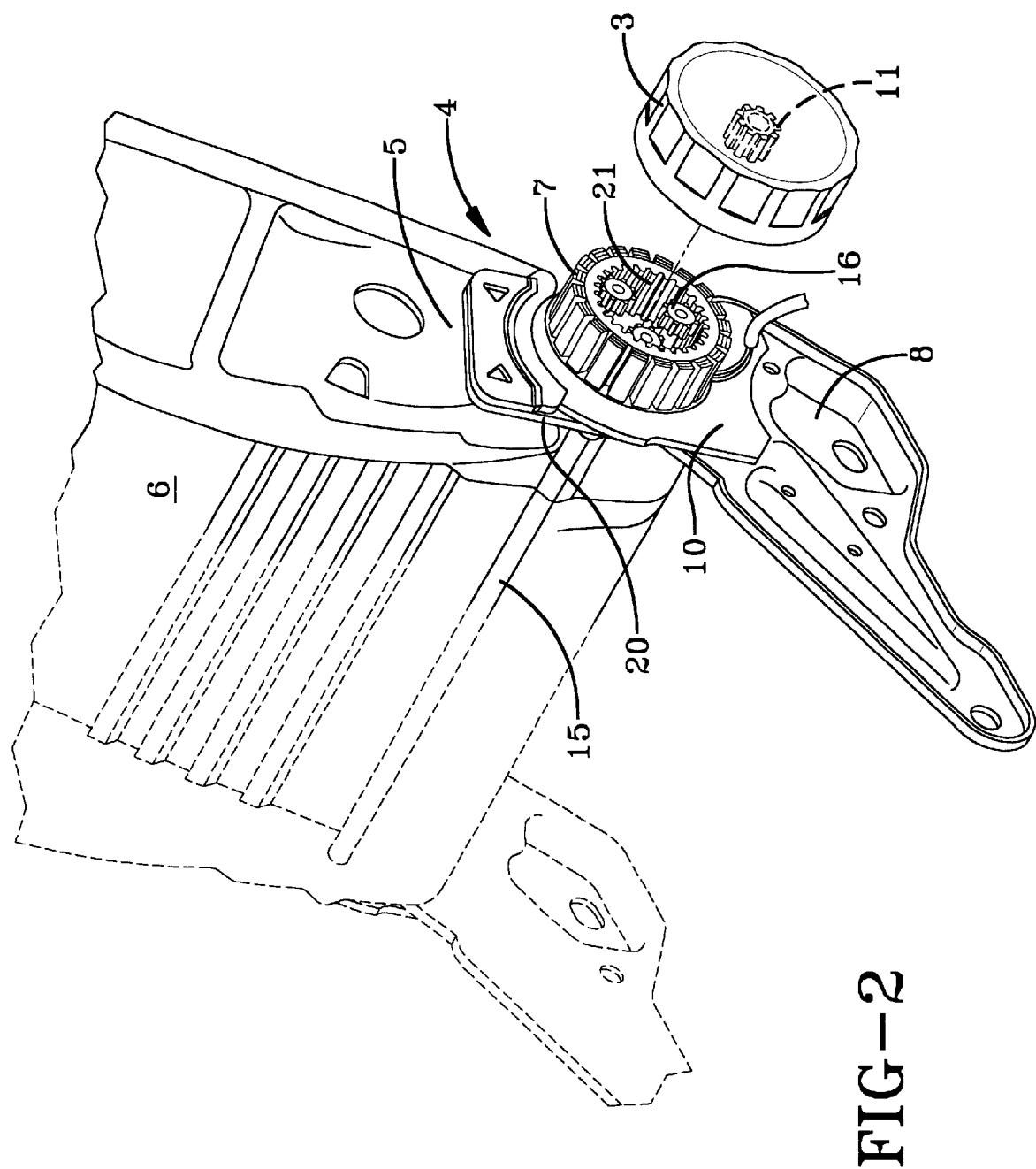
FIG. 2 shows a perspective arrangement of the embodiment on a vehicle seat.

The illustrated embodiments have an electric motor 1 of which the constituents are arranged in the interior of a hand wheel 3. The electric motor 1 comprises a stator 7 which is anchored via an adapter 19 on a gear part 10 rigidly connected to the seat frame 8. In the interior of the stator 7 there is a reduction gear 9 that is designed as a planetary gear in the embodiments illustrated. The planetary gear comprises planet wheels 16 which mesh with a ring gear 21 provided on the interior of the stator 7. The planet wheels 16 are mounted rotatably on a planet wheel carrier 13. The stator of the electric motor is advantageously fastened on the seat frame and, in particular, on the gear part of the adjusting gear that is anchored on the seat frame. In a known manner, the adjusting gear can comprise a cam the shaft of which is surrounded by a wobble plate which is rigidly connected to the adjustable back rest frame and engages with external teeth in internal teeth on the gear part rigidly connected to the seat frame. The camshaft is connected non-rotatably to the output shaft that is driven either by the electric motor and/or by the hand wheel. With the design of the reduction gear integrated in the electric motor as a planetary gear, the planet wheel carrier can be connected non-rotatably to the output shaft. The torque delivered by the electric motor is therefore transmitted from the planet wheel carrier to the output shaft. The output shaft can advantageously be lengthened to a transmission shaft that extends substantially over the entire width of the seat and is connected to the backrest frame on both sides of the vehicle seat. The rotatable mounting of the electric motor rotor can be provided on the transmission shaft or on an extension thereof. The rotor can also be supported rotatably via the planetary gear on the stator on which the ring gear of the planetary gear is formed.

Figure 4:
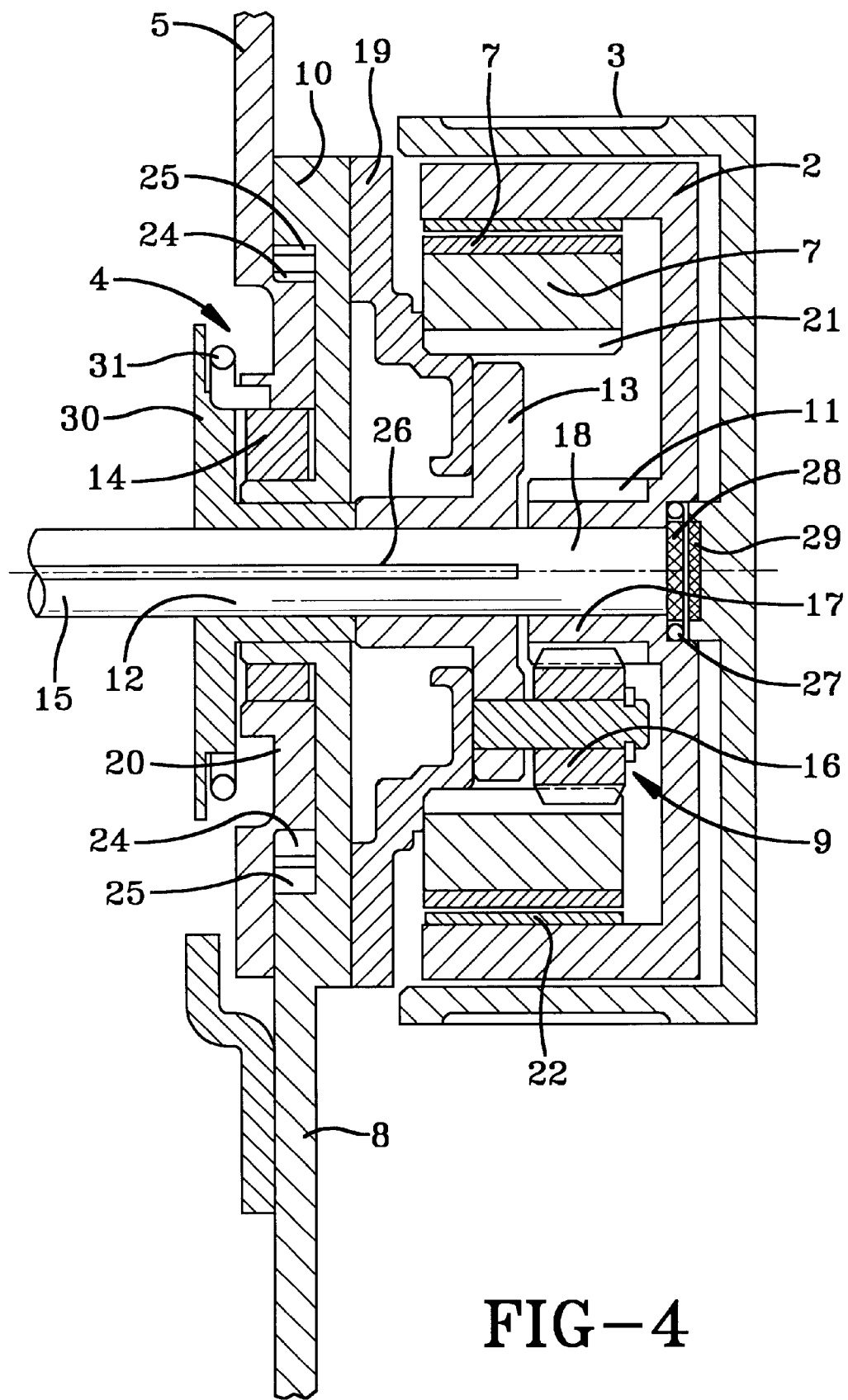
FIG. 4 is a sectional view of a further embodiment of the invention.

The electric motor also comprises a rotor 2 that is designed as an external rotor. The rotor poles 22 are permanent magnets. The rotor of the electric motor is preferably designed as an external rotor that acts via a reduction gear on the adjusting gear which also acts as a reduction gear and is rigidly connected to the adjustable back rest frame by its adjustable part. Gear reductions of 1:150 can therefore be achieved. Output torques of about 1200 Nm can be caused to act on the output shaft. The hand wheel can also be formed from one piece with the rotor of the electric motor The rotor 2 is hood-shaped in design and possesses on a bearing collar 17 a sun wheel 11 with which the planet wheels, for example the planet wheels 16, mesh. The bearing collar 17 can be rotatably mounted on a bearing journal 18, as shown in FIG. 4. The bearing collar 17 and therefore the rotor 2 can also be rotatably mounted via the planetary gear 9 on the stator 7 and adapter 19, as shown in FIG. 1. The electric motor with the integrated planetary gear has a construction of the type known, for example, from DE 43 02 042 A1. The torque produced by the electric motor is transmitted via the planet wheel carrier 13 to an output shaft 12. For this purpose, the output shaft 12 can comprise a toothing notch 26 by means of which a non-rotatable connection between the planet wheel carrier 13 and the output shaft 12 is produced. A coupling part 30 rotatably mounted on the seat frame 8 also engages non-rotatably with the toothing notch 26 of the output shaft 12. A compensating spring 31 which acts on a wobble plate 20 of the adjusting gear 4 is connected non-rotatably to the coupling part 30.

A direct rotary connection between the planet wheel carrier 13 and the coupling part 30 can also be provided instead of the non-rotatable connection between the planet wheel carrier 13 and the coupling part 30 via the output shaft 12 provided with the toothing notch 26. As shown in FIGS. 1 and 4, the components of the electric motor 1 and of the reduction gear (planetary gear) 9 integrated therein are located in the interior of the hand wheel 3 which is designed in the shape of a hood and which surrounds this unit as a housing.

In the embodiment shown in FIG. 1, the rotor of the electric motor 1 and the hand wheel 3 consist of one piece. In the embodiment shown in FIG. 4, the hand wheel 3 surrounds the rotor 2 in the form of a housing. For this purpose, the hand wheel 3 is also designed in the shape of a hood. The hand wheel 3 is normally held out of rotational engagement with the output shaft 12 by means of a restoring spring 27. As a result, the rotational movement of the rotor 2 takes place when the hand wheel 3 is stationary. For coupling the hand wheel 3, the hand wheel 3 can be displaced axially against the force of the restoring spring 27 by an engagement part 29. The engagement part 29 thus interlocks positively with an engagement part 28 on the output shaft 12 or on the bearing journal 18 formed integrally with the output shaft 12. The engagement parts 28, 29 can have appropriate teeth for this purpose. It is thus possible to apply an adjusting movement to the output shaft 12 by means of the hand wheel.

As already mentioned, the rotational movement of the output shaft 12 is transmitted via the coupling part 30 to an adjusting gear 4. The adjusting gear 4 consists of a cam with a camshaft 14. The camshaft 14 is surrounded by a wobble plate 20 that is rigidly connected to a backrest frame 5 consisting of rigid material. The wobble plate 20 has external teeth 24 which engage in internal teeth 25 of the gear part 10 rigidly connected to the seat frame 8 within an angular range of engagement. Owing to the gear reduction of, for example, 1:150, which can be achieved when the planetary gear 9 interacts with the adjusting gear 4 which has a reducing action, output torques of about 1200 Nm can be transmitted during adjustment of the back rest.

The output shaft 12 can be lengthened in one piece over the width of the seat and can form a transmission shaft 15. The transmission shaft 15 can be connected to a respective adjusting gear 4 on both sides of the seat. An electric motor 1 with associated hand wheel 3 can optionally be provided on both sides.

The electric motor is preferably a brushless d.c. motor. Smoothly controlled adjustment rates can thus be achieved to allow, for example, a slow start, a fast intermediate adjustment and a precise fine adjustment of the inclination of the back rest. This can be achieved by appropriate actuation of the switch.

The motor can detect, for example, its respective zero position by initialization, for example during activation of the central locking. An integrated memory function for a respective starting position of the back rest can thus be achieved, into which the back rest can automatically be returned after an adjustment.

Owing to the high output torque which can be achieved, it is possible to bring the back rest 6 in short-time duty into a safety position in which risks of injury, in particular in the event of a rear impact, are clearly reduced. This pivoting of the backrest can be carried out reversibly and can optionally take place as a function of sensor signals of a precrash sensor.

Figure 3:
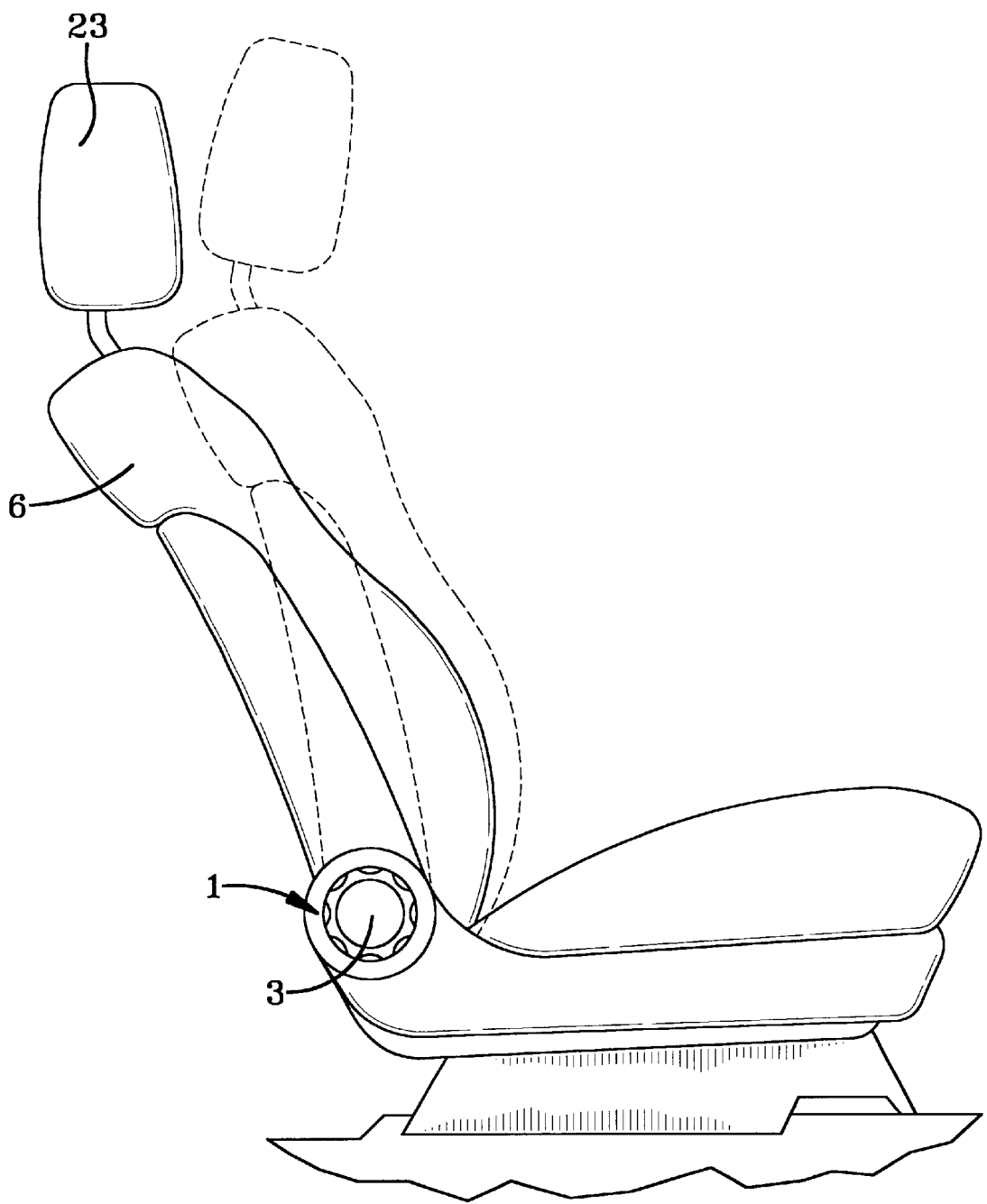
FIG. 3 is a side view of a vehicle seat on which an embodiment of the invention is provided.

Owing to the pivoting of the back rest which takes place within a short period of time, for example from a comfort position which is shown in solid lines in FIG. 3 into the safety position which reduces the risk of injury and is shown in broken lines in FIG. 3, a forwardly and upwardly directed adjustment of a head rest 23 can take place at the same time. This adjustment of the headrest can be carried out actively by the rotation of the transmission shaft 15 during the pivoting of the backrest via a suitable gear.

Many changes and modifications in the above-described embodiments of the invention can, of course, be carried out without departing from the scope thereof. Accordingly, that scope is intended to be limited only by the scope of the appended claims.

I claim:

1. An apparatus for adjusting the inclination of a back rest of a vehicle seat comprising an electric motor and a hand wheel as adjusting drives which act on an adjustable back rest frame via an adjusting gear, wherein the hand wheel is arranged coaxially to a rotor of the electric motor and accommodates components of the motor as a hood-shaped housing in its interior.

2. The apparatus according to claim 1 wherein the rotor of the electric motor is integral with the hand wheel.

3. The apparatus according to claim 2 wherein the rotor is connected via a reduction gear to the adjusting gear.

4. The apparatus according to claim 2 wherein the rotor is designed as an external rotor of the electric motor and the electric motor has a stator that is supported on a seat frame.

5. The apparatus according to claim 4 wherein the rotor is connected via a reduction gear to the adjusting gear.

6. The apparatus according to claim 1 wherein the hand wheel surrounds the rotor of the electric motor in the manner of a hood and can be brought into rotational engagement with the adjusting gear by hand.

7. The apparatus according to claim 6 wherein the rotor is connected via a reduction gear to the adjusting gear.

8. The apparatus according to claim 1 wherein the adjusting gear comprises a cam that is driven by either of the adjusting drives, a cam shaft of which is surrounded by a wobble plate which is rigidly connected to the adjustable back rest frame and engages with external teeth in internal teeth on a gear part rigidly connected to a seat frame.

9. The apparatus according to claim 8 wherein the camshaft is connected non-rotatably to an output shaft.

10. The apparatus according to claim 1 wherein the hand wheel and the electric motor have a common output shaft connected to the adjusting gear.

11. The apparatus according to claim 10 wherein the rotor is connected via a reduction gear to the adjusting gear.

12. The apparatus according to claim 11 wherein the reduction gear is a planetary gear integrated in the electric motor.

13. The apparatus according to claim 12 wherein the output shaft extends to a transmission shaft that has a length great enough to extend over substantially the entire width of the seat and can be connected to the back rest frame on both sides of the vehicle seat via a two-sided adjusting gear.

14. The apparatus according to claim 12 wherein the adjusting gear comprises a cam that is driven by either of the adjusting drives, a cam shaft of which is surrounded by a wobble plate which can be rigidly connected to the adjustable back rest frame and can engage with external teeth in internal teeth on a gear part rigidly connected to a seat frame.

15. The apparatus according to claim 14 wherein a planet wheel carrier of the reduction gear designed as a planetary gear is connected non-rotatably to an output shaft.

16. The apparatus according to claim 14 wherein the output shaft extends to a transmission shaft that has a length great enough to extend over substantially the entire width of the seat and can be connected to the back rest frame on both sides of the vehicle seat via a two-sided adjusting gear.

17. The apparatus according to claim 14 wherein the camshaft is connected non-rotatably to an output shaft.

18. The apparatus according to claim 17 wherein a planet wheel carrier of the reduction gear designed as a planetary gear is connected non-rotatably to an output shaft.

* * * * *